US011087394B2

(12) United States Patent
Tumulty, II et al.

(10) Patent No.: US 11,087,394 B2
(45) Date of Patent: Aug. 10, 2021

(54) SYSTEM AND METHOD FOR ANTICIPATING AND PREVENTING ACCOUNT OVERDRAFTS

(71) Applicant: Rapid Financial Services, LLC, Bethesda, MD (US)

(72) Inventors: William Joseph Tumulty, II, Davidsonville, MD (US); Bogdan Aurel Nastea, Beltsville, MD (US)

(73) Assignee: Rapid Financial Services, LLC, Bethesda, MD (US)

( * ) Notice: Subject to any disclaimer, the term of this patent is extended or adjusted under 35 U.S.C. 154(b) by 191 days.

(21) Appl. No.: 16/135,893

(22) Filed: Sep. 19, 2018

(65) Prior Publication Data

US 2020/0090261 A1 Mar. 19, 2020

(51) Int. Cl.
*G06Q 40/02* (2012.01)
*G06Q 20/42* (2012.01)
*G06Q 20/26* (2012.01)
*G06Q 20/10* (2012.01)
*G06N 20/00* (2019.01)

(52) U.S. Cl.
CPC .......... *G06Q 40/02* (2013.01); *G06Q 20/108* (2013.01); *G06Q 20/26* (2013.01); *G06Q 20/42* (2013.01)

(58) Field of Classification Search
CPC .................................................. G06N 20/00
See application file for complete search history.

(56) References Cited

U.S. PATENT DOCUMENTS

| 7,149,347 | B1 | 12/2006 | Wnek | |
|---|---|---|---|---|
| 7,533,006 | B2* | 5/2009 | Huddleston | G06Q 10/10 703/2 |
| 7,676,408 | B2* | 3/2010 | Moebs | G06Q 10/10 700/99 |
| 8,290,272 | B2 | 10/2012 | Filimonova et al. | |
| 8,490,869 | B2* | 7/2013 | Brown | G06Q 20/10 235/380 |
| 8,775,300 | B2* | 7/2014 | Showalter | G06Q 40/025 705/38 |
| 9,418,315 | B1 | 8/2016 | Keogh et al. | |
| 2004/0193537 | A1* | 9/2004 | Knapp | G06Q 20/10 705/39 |
| 2004/0225604 | A1* | 11/2004 | Foss, Jr. | G06Q 40/02 705/39 |
| 2006/0059085 | A1* | 3/2006 | Tucker | G06Q 40/025 705/38 |

(Continued)

*Primary Examiner* — Christopher Bridges
(74) *Attorney, Agent, or Firm* — Honigman LLP (57) ABSTRACT

A method for anticipating and preventing financial account overdrafts includes receiving financial data for a financial account associated with a user. A likelihood that the financial account will experience an overdraft event is determined using a funds transaction model, where the funds transaction model is configured to predict overdraft events based on financial data. When the likelihood that the financial account will experience an overdraft even exceeds a threshold, the method further includes transferring an amount of funds into the financial account associated with the user. The amount of funds transferred to the financial account is sufficient to prevent the overdraft event. Finally, a notification is transmitted to a user system associated with the user. The notification indicates the transfer of an amount of funds into the financial account.

20 Claims, 3 Drawing Sheets

(56) References Cited

U.S. PATENT DOCUMENTS

| | | | |
|---|---|---|---|
| 2011/0295731 A1* | 12/2011 | Waldron, III | G06Q 10/0635 |
| | | | 705/35 |
| 2013/0060669 A1* | 3/2013 | Rose | G06Q 40/00 |
| | | | 705/35 |
| 2013/0318426 A1 | 11/2013 | Shu et al. | |
| 2015/0081543 A1* | 3/2015 | Brereton | G06Q 20/4016 |
| | | | 705/44 |
| 2017/0323345 A1* | 11/2017 | Flowers | G06F 17/18 |
| 2018/0060843 A1* | 3/2018 | Maheshwari | G06Q 20/3224 |
| 2019/0259095 A1* | 8/2019 | Templeton | G06N 3/0445 |

* cited by examiner

SYSTEM AND METHOD FOR ANTICIPATING AND PREVENTING ACCOUNT OVERDRAFTS

TECHNICAL FIELD

This disclosure relates to systems and methods for preventing financial account overdrafts based on anticipated account activity.

BACKGROUND

Generally, financial accounts may be linked to one or more third-party accounts to allow funds to electronically deposited to and withdrawn from the financial accounts without the need for the exchange physical financial instruments, such as cash or checks. In some instances, financial accounts may be linked to third-party accounts and configured to have funds automatically deposited or withdrawn periodically without interaction from the user associated with the financial account. For example, financial accounts may be configured to have wages directly deposited on regular interval. Conversely, financial accounts may be configured to have funds automatically withdrawn by third-parties, such as utility providers, cellular phone service providers, financial lenders, and the like. While convenient, the transfer of funds may result in overdrafts of the financial accounts where account users are unable to provide sufficient funds to the financial account prior to the transaction or merely unaware that a transaction is about to occur.

Many financial institutions charge fees for each occurrence of an overdraft or non-sufficient funds transaction (NSF), which sometimes amount to a greater amount of funds than the amount of the overdraft itself. Alternatively, some financial institutions offer overdraft protection services, where a secondary financial account (e.g., savings account, checking account) owned by the user and held with the financial institution is authorized to transfer funds to the primary financial account (e.g., checking account) after an overdraft of the primary financial account occurs. Generally, relatively significant fees are still charged by the financial institution for initiating the overdraft protection transfer between the secondary accounts and the primary accounts. Accordingly, it would be desirable to anticipate and prevent account overdrafts without the need to pay exorbitant fees to the financial institution.

SUMMARY

One aspect of the disclosure provides a method for preventing an overdraft of a financial account. The method includes receiving, at data processing hardware, financial data for a financial account associated with a user. Here, the method includes determining, by the data processing hardware, a likelihood that the financial account will experience an overdraft event using a funds transaction model, where the funds transaction model is configured to predict overdraft events based on financial data. When the likelihood that the financial account will experience an overdraft even exceeds a threshold, the method further includes transferring, by the data processing hardware, an amount of funds into the financial account associated with the user. The amount of funds transferred to the financial account is projected to be sufficient to prevent the overdraft event. Finally, a notification is transmitted to a user system associated with the user. The notification indicates the transfer of an amount of funds into the financial account.

Another aspect of the disclosure provides a system comprising data processing hardware and memory hardware in communication with the data processing hardware. The memory hardware stores instructions that, when executed by the data processing hardware, cause the data processing hardware to perform operations for predicting and preventing an overdraft of a financial account. The operations include receiving financial data for a financial account associated with a user and determining a likelihood that the financial account will experience an overdraft event using a funds transaction model configured to predict overdraft events based on financial the financial data. When the likelihood that the financial account will experience the overdraft even exceeds a threshold, the operations include transferring an amount of funds into the financial account associated with the user, where the amount of funds is predicted to be sufficient to prevent the occurrence of the overdraft event. The operations further include transmitting a notification to a user system associated with the user, where the notification indicates the transfer of the amount of funds into the financial account.

Implementations of the disclosure may include one or more of the following optional features. In some implementations, the funds transaction model is trained using a plurality of training samples. The training samples include positive training samples comprising financial data for one or more financial accounts that have experienced one or more overdraft events. The training samples also include negative training samples comprising financial data for one or more financial accounts that have never experienced overdraft events.

In some implementations, the financial data for the financial account comprises a transaction history including one or more deposit transaction depositing funds into the financial account and/or one or more withdrawal transaction withdrawing funds from the financial account.

In some examples, the financial data for the financial account comprises a plurality of transaction histories associated with third-party accounts and comprising one or more deposit transactions depositing funds into the third-party accounts and one or more withdrawal transactions withdrawing funds from the third-party accounts.

In some implementations, the method includes the steps of determining, by the data processing hardware, an overdraft amount associated with the overdraft event and obtaining, by the data processing hardware, an amount of funds sufficient to prevent the overdraft event based on the predicted overdraft amount. These steps may be executed when the likelihood that the financial account will experience an overdraft exceeds the threshold. Here, the method may further include generating, by the data processing hardware, a loan document indicating repayment terms assigned to the user for repaying the amount of funds transferred into the financial account.

In some examples, transferring the amount of funds into the financial account associated with the user includes determining, by the processing hardware, a date/time at which the overdraft event will occur, and transferring the amount of funds into the financial account before the data/time at which the overdraft will occur.

In some cases, the method may include determining, by the data processing hardware, a predicted loan duration period.

In some implementations, the method includes receiving, by the data processing hardware, a bank overdraft fee schedule and determining, by the data processing hardware, whether a fee associated with transferring the amount of funds into the financial account exceeds a corresponding fee of the bank overdraft fee schedule. When the fee associated with transferring the amount of funds into the financial account does not exceed the corresponding fee of the account overdraft fee schedule, the amount of funds is transferred to the financial account. Conversely, when the fee associated with transferring the amount of funds into the financial account does exceed the corresponding fee of the account overdraft fee, the amount of funds is not transferred to the financial account.

In some examples, the notification includes a loan authorization prompt.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Generally, machine learning is the process of implementing statistical techniques to provide computers with the ability to learn without being manually programmed. The computer may be provided with one or more training data sets for building an initial model and/or one or more feedback datasets for adjusting the model. Machine learning may implemented for predicting future events or outcomes using one or more of the models built based on historical occurrences or patterns. In the context of the instant disclosure, machine learning may be used to predict a likelihood of a financial account being overdrawn based on anticipated transactions. Based on the anticipated transactions and the likelihood of an overdraft, a financial account user may authorize a an account monitor to execute a transfer of funds into the financial account prior to the occurrence of the overdraft, thereby preventing the payment of fees associated with an overdraft to the financial institution.

Figure 1:
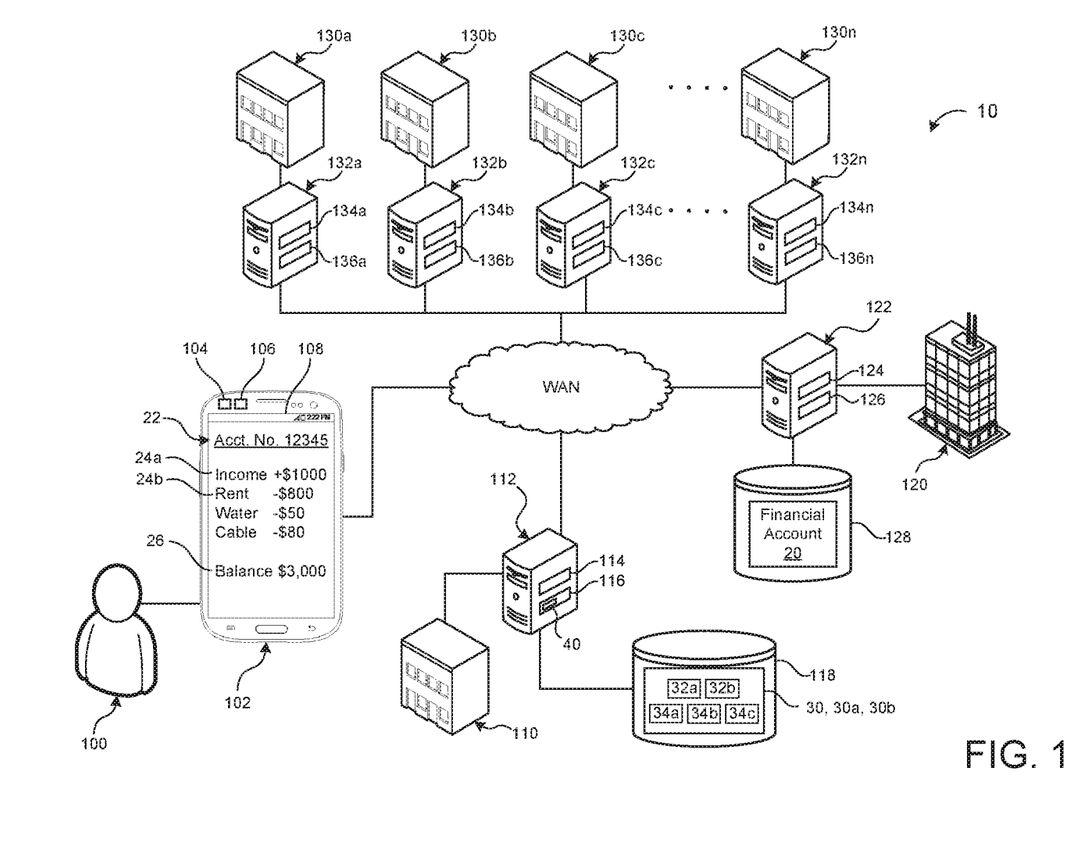
FIG. 1 is schematic view of an overdraft anticipation and prevention environment according to the principals of the instant disclosure.

Referring to FIG. 1, an example of an overdraft anticipation and prevention environment 10 is provided. The environment 10 includes a user 100, an account monitor 110, a financial institution 120, and one or more external accounts 130 in communication with each other over one or more networks 140.

In the illustrated example, the user 100 accesses the network 140 via a user system 102 having data processing hardware 104, memory hardware 106, and a graphical user interface 108. In the illustrated example, the user system 102 is configured to display information related to a financial account 20 of the user 100, where the financial account 20 is maintained by the financial institution 120. For example, in the illustrated example the graphical user interface 108 displays a financial account summary 22 for the financial account 20, including a schedule of financial transactions 24 and a balance 26 associated with the financial account 20. As discussed in greater detail below, the financial transactions include credit transactions 24a where funds are deposited into the financial account 20 and debit transactions 24b where funds are withdrawn from the financial account 20. Although illustrated as a mobile device, such as a smart phone or tablet, the user system 102 may be any computing device configured for allowing the user 100 to access, view, and interact with the financial account 20, such as a personal computer, a network-enabled television, or the like.

Referring still to FIG. 1, the account monitor 110 is connected to the network 140 via one or more account monitor systems 112 having data processing hardware 114 and memory hardware 116. The account monitor system 112 may further include or communicate with financial data storage 118 configured to store financial data 30 associated with the financial account 20, as discussed in greater detail below. Generally, the account monitor system 112 is configured to receive the financial data 30 related to the financial account 20 from one or more sources via the network 140, to analyze the financial data 30 to determine the likelihood of an overdraft of the financial account 20, and to determine an amount of funds to be transferred to the financial account 20. In some examples, the account monitor system 112 may automatically transfer the amount of funds to the financial account 20. Alternatively, the user 100 may authorize or prompt the account monitor system 112 to transfer the amount of funds to the financial account 20 using the user system 102.

With continued reference to FIG. 1, the financial institution 120 is generally an entity associated with maintaining the financial account 20 associated with the user 100. For example, the financial institution 120 may be a commercial bank that offers various types of financial accounts to patrons. The financial institution 120 is in communication with the network 140 via a financial institution system 122 having data processing hardware 124 and memory hardware 126. The financial institution system 122 is configured maintain the financial account 20, whereby the financial account 20 can be accessed over the network 140 by the user 100 using the user system 102 or by the account monitor 110 using the account monitor device 112. Accordingly, the financial institution system 122 may include or communicate with financial data storage 128. The financial data storage 128 may be configured to store data related to the financial account 20.

The environment 10 further includes one or external accounts 130 associated with the user 100. Examples of external accounts 130 include billing accounts 130a for various utilities and services (e.g., water, cable, telephone), payment and credit accounts 130b (e.g., credit cards, online and mobile payment systems), additional financial accounts 130c held by the financial institution 120 or other financial institutions, and/or any other external account 130n that the user 100 may conduct transactions with using the financial account 20. Each of the external accounts 130a-130n may communicate with the network 140 using an external account system 132a-132n having data processing hardware 134a-134n and memory hardware 136-136n.

The network 140 may be one or more of a wireless network, a wired network, or any combination of a wireless network and a wired network. For example, network 140 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal. Additionally or alternatively, the network 140 may include, without limitation, telephone lines, fiber optics, IEEE Ethernet 902.3, a wide area network (WAN), a local area network (LAN) or a global network such as the Internet. Also, network 140 may support an Internet network, a wireless communication network, a cellular network, or the like, or any combination thereof. Network 140 may further include one network, or any number of example types of networks mentioned above, operating as a stand-alone network or in cooperation with each other. Network 140 may utilize one or more protocols of one or more network elements to which they are communicatively couples. The network 140 may translate to or from other protocols to one or more protocols of network devices. Although the network 140 is depicted as a single network, it should be appreciated that the network 140 may comprise a plurality of interconnected networks, such as, for example, the Internet, a service provider's network, a cable television network, corporate networks, and home networks.

In use, each of the user system 102, the account monitor system 112, and the external systems 132a-132n are in communication with the financial institution system 122 via the network 140. In some examples, the user system 102, the account monitor system 112, and the external systems 132a-132n may communicate directly with the financial institution system 122 via a financial institution program, such as a downloadable software application or a web browser.

Alternatively, the financial account 20 may be accessible through the financial institution system 122 via an application programming interface (API). For example, one or more of the external accounts 130 may provide a software application for interfacing with the financial account 20, whereby the financial data 30 of the financial account 20 can be provided to or harvested from the financial institution system 122 without direct interaction with the financial institution system 122 by the user 100, the account monitor 110, or the external account 130. In the illustrated example, the account monitor system 112 is configured to receive the financial data 30 from the financial institution system 122 by accessing the financial account 20 using login credentials provided by the user 100 associated with the financial account 20. Accordingly, the account monitor system 112 can monitor the financial transactions 24 corresponding to the financial account 20 in real time, as discussed in greater detail below.

Figure 2:
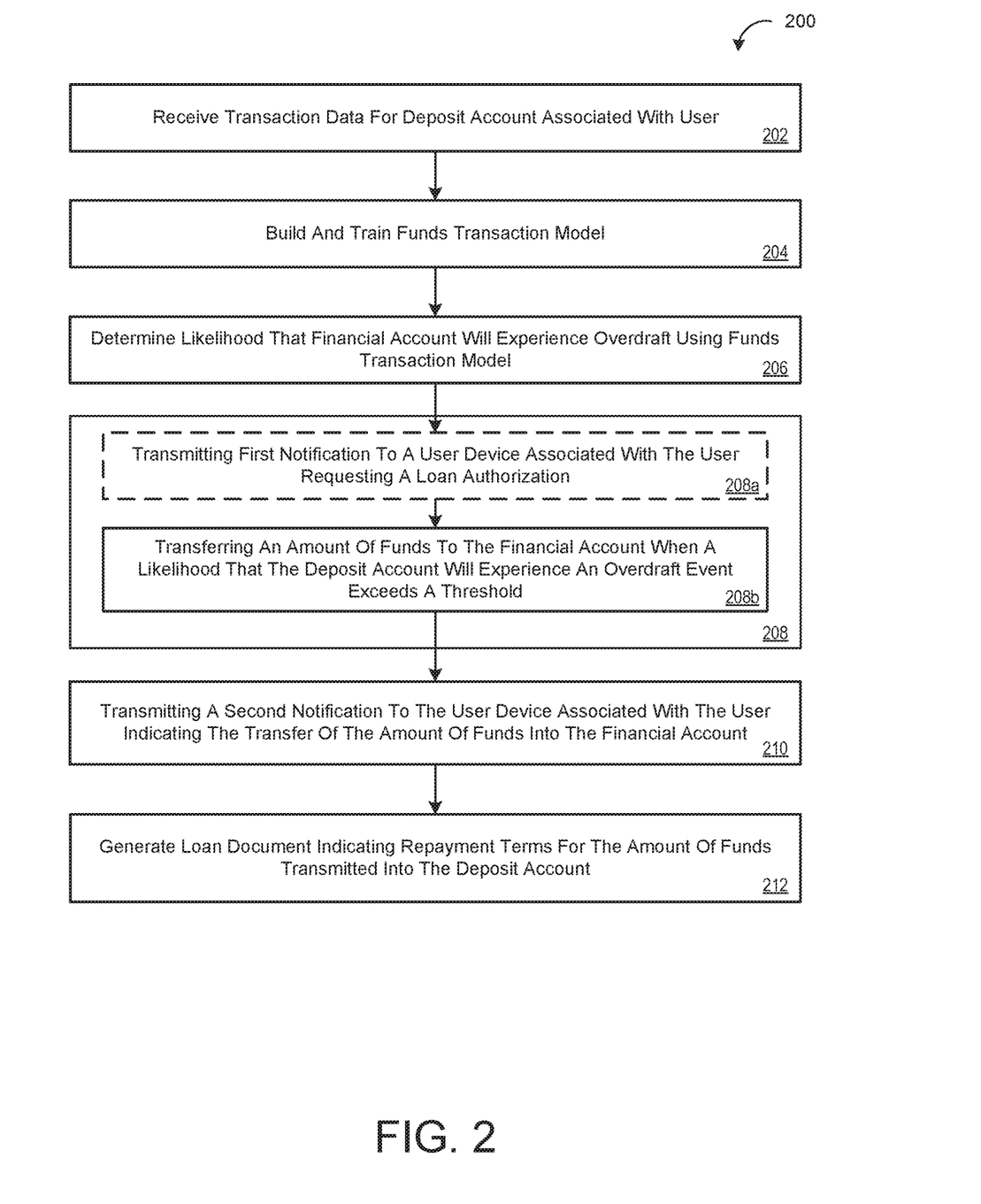
FIG. 2 is a flow diagram for an example method for anticipating and preventing an overdraft of a financial account.

FIG. 2 illustrates a method 200 for anticipating and preventing overdrafts of the financial account 20. In some examples, the method 200 may be carried out by the data processing hardware 104, 114, 124, 134 of one or more of the systems 102, 112, 122, 132, whereby the data processing hardware 104, 114, 124, 134 executes instructions stored in the memory hardware 106, 116, 126, 136 of the one or more of the systems 102, 112, 122, 132. In some examples, the method 200 may be carried out by a software application implemented on or accessed by one or more of the systems 102, 112, 122, 132. As used herein, a software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

At block 202, the method 200 includes receiving financial data 30 for the financial account 20 associated with the user 100. The financial data 30 may be classified as local financial data 30a and global financial data 30b. Local financial data includes user-specific financial data 30a that is directly related to the financial account 20. For example, the local financial data 30a may include a balance history, a debit history, and a credit history for the financial account 20 itself. Global financial data 30b includes financial data associated with third-party sources that are determined as being relevant to the financial account. For example, where third-party financial accounts are identified as having transaction histories that are similar to the financial account 20, the global financial data 30b associated with the third-party users may be received by the account monitor system 112.

The financial data 30 includes transaction data 32 and financial environment data 34. Transaction data 32 refers to data directly related to financial transactions that have occurred in the past, whereby various transaction patterns can be identified by the account monitor system 112 in constructing and correcting funds transaction models 40, as discussed below. Financial environment data 34 refers to data that is indirectly associated with financial transactions. For example, external factors may be recognized as being likely to affect values and/or frequencies of transactions 24, such as changes in weather, geography, or demographics.

As provided above, the transaction data 32 may be classified as local transaction data 32a, which is directly associated with the financial account 20 being managed by the account monitor system 112, and global transaction data 32b, which is associated with third-party financial accounts that are identified as being similar to the financial account 20, and can be used to influence the funds transaction models 40. For example, a funds transaction model 40 may be built primarily using the local transaction data 32a because it directly reflects actual transactions 24 that have occurred in the financial account 20. The global transaction data 32b may then be used to influence the funds transaction model 40 by supplementing or correcting the local transaction data 32a.

The local transaction data 32a may be received from the financial institution system 122 by the account monitor system 112 in real time when the account monitor system is authorized to access the account monitor system 112 by the user 100. For example, the account monitor system 112 may directly pull a transaction history of the financial account 20 from the financial data storage 128. Alternatively, the account monitor system 112 may receive and evaluate monthly account statement documents for the financial account 20 to determine the transaction history, where the monthly account statements are "pushed" to the account monitor system 112 by the user system 102 or the financial institution system 122. The transaction history will include a one or more credit transactions 24a, where funds are deposited into the financial account, and one or more debit transactions 24b, where funds are withdrawn from the account.

The global transaction data 32b may be received from financial monitoring services (e.g., Equifax, Lexis Nexis, etc.) or may include global transaction data 32b compiled by the account monitor 112. As discussed above, the global transaction data 32b may be utilized where the local transaction data 32a is insufficient or too irregular to train the funds transaction model 40.

Collectively, the local transaction data 32a and the global transaction data 32b may include sufficient transaction data 32 to provide the account monitor system 112 with positive training samples and negative training samples. Positive training samples include transaction data 32 for one or more financial accounts that have experienced one or more overdraft events in the past. Accordingly, these samples can be used to train the funds transaction model 40 when an overdraft is likely. Conversely, the negative training samples include transaction data 32 for financial accounts that have never experienced an overdraft event. Accordingly, the negative training samples can be used to train the funds transaction model 40 when overdrafts are not likely.

In addition to transaction data 32, the account monitor system 112 may receive environmental data 34 for training the funds transaction model 40. Environmental data 34 is described as financial data 30 that does not directly involve a transaction 24, but which may indirectly influence past and future transactions. For example, the environmental data 34 may include seasonal trend data 34a, geographical trend data 34b, and/or demographic trend data 34c, each of which may be local or global, as discussed above. For example, the seasonal trend data 34a may include financial data 30 indicating that certain types of a spending are more likely to occur during particular periods (e.g. increased spending on energy during warm months). Likewise, geographic trend data 34b may include transaction data 32 for a particular region. For example, local prices of utilities and economic conditions may be considered. Demographic trend data 34c may indicate particular transactional trends for a user based on corresponding transaction trends for users having related demographics. For example, users having a particular income level may be identified in the funds transaction model 40 as being likely to have disposable income for spending on entertainment. The environmental data 34 may be received from third-party data providers, such as data analytics services, weather services, and information collection services.

At block 204, the method 200 includes building and training one or more funds transaction models 40 using the financial data 30. Generally, the funds transaction model 40 is built by the account monitor system 112 based on an analysis of the financial data 30. The analysis may include implementation of one or more machine learning algorithms and/or statistical analysis for identifying trends or patterns in the financial data 30, which can then be used to anticipate overdrafts of the financial account 20. The account monitor system 112 may also utilize machine learning and statistical analysis to correct and/or adjust the funds transaction model. Here, the account monitor system 112 may continuously improve determinations of predicted financial transactions and/or income associated with an internal account and account balance calculations. Machine learning may include, for example, supervised learning, unsupervised learning, semi-supervised learning, transduction, reinforcement learning, and other learning algorithms. For example, machine learning algorithms may include AODE, artificial neural networking, Bayesian algorithms, case-based reasoning, decision tree algorithms, Gaussian process regression, regression analysis, fuzzy algorithms, and/or a customized machine learning algorithm including aspects of any machine learning algorithm. The financial institution may also provide a threshold associated with the account balance and predicted financial transactions and/or financial data to trigger an overdraft prevention measure, such as transferring funds to the financial account 20, as discussed below.

Using the local transaction data 32a, the account monitor system 112 can identify recurring local transactions that should be built into the funds transactions models 40. Recurring transactions include transactions that occur on a regular interval. For example, a user 100 may have income associated with employment deposited on a regular basis (e.g., weekly, monthly). Likewise, the user 100 may have recurring debits associated with payments made by the user 100 on a regular basis. As the account monitor system 112 is provided with more local transaction data 32a, a certainty of recurring transactions will be adjusted based on a regularity of an occurrence of the transaction.

Recurring transaction data 32 may also be broken down into fixed recurring transactions 24 and variable recurring transactions 24. Fixed recurring transactions are for the same amount every transaction period (e.g., mortgage payments, cable bills, salary-based paychecks), while variable recurring transactions may be for a different amount every period (e.g., energy bills, merit-based paychecks). The certainty of variable recurring transactions 24 will generally be lower than the certainty of fixed recurring transactions 24, as the account monitor system 112 may anticipate that a transaction is going to occur, but will be unable to know the exact amount of the anticipated transaction 24. Over time, the account monitor system 112 may recognize trends or patterns associated the variable recurring transactions 24, such that the certainty associated with the transaction will increase as the funds transaction model 40 receives more financial data 30. For example, over the course of one or more years, the account monitor system 112 will learn that energy bills will vary depending on the time of year (e.g., higher gas bills in winter, higher electric bills in summer).

As provided above, the global transaction data 32b may be used by the account monitor system 112 to supplement or correct the local transaction data 32a. For example, where there is insufficient local transaction data 32a to build a funds transaction model 40 for the financial account 20, the account monitor system 112 may rely partially or entirely on the global transaction data 32b for building the funds transaction model 40. The global transaction data 32b may comprise transaction data 32 for third-party financial accounts that are determined to be relevant to the financial account 20. Relevancy of third-party accounts may be determined by the account monitor system 112 or may be manually identified. In some examples, the account monitor system 112 will recognize third-party accounts having similar financial characteristics such as balances, transaction patterns, transaction types, and transaction amounts, for example. Additionally or alternatively, third-party accounts may be identified as being relevant based on characteristics of the account users.

In some examples, the global transaction data 32b may be used by the account monitor system 112 to build a funds transaction model 40 that anticipates transaction amounts for variable recurring transactions where the local transaction data 32a is insufficient. For example, where the account monitor system 112 recognizes a monthly transaction involving a particular party (e.g., electricity company), but does not have a full year worth of local transaction data 32a, the account monitor system 112 may rely on global transaction data 32b for third-party accounts associated with similar geographical areas, home types, and/or having transaction amounts that correlate with the available transaction amounts of the local transaction data 32a. Accordingly, where local transaction data 32a only exists for the months of January through June, the account monitor system 112 may rely on the global transaction data 32*b* to train the funds transaction model for the months of July through December, for example.

The local financial data 30*a* and the global financial data 30*b* may be weighted by the account monitor system 112 when building the funds transaction model 40, such that the funds transaction model 40 is more heavily influenced by the local financial data 30*a* or the global financial data 30*b*. For example, it may be desirable to rely more heavily on the local financial data 30*a*, since this data reflects known transactions that are associated with the financial account 20, whereas the global financial data 30*b* is only indirectly associated with the financial account. Likewise, transaction data 32 may be weighted more heavily than environmental data 34 because transaction data 32 more accurately reflects actual transactions that have occurred. As discussed, above, the funds transaction model 40 is trained using a history of financial data 30, including local and global transaction data 32*b*, 32*b* and environmental data 34. Using machine learning, the funds transaction model 40 will be trained until a threshold certainty level is met by the funds transaction model 40.

As provided above, the account monitor system 112 receives the financial data 30 and builds one or more transaction funds models 40 using the financial data 30. For example, various funds transaction models 40 may be constructed using different machine learning algorithms, whereby each of the funds transaction models 40 is relied upon to improve certainty. Additionally or alternatively, different funds transaction models 40 may be built based on the various types of financial data 30 described above. For example, one or more funds transaction models 40 may be built relying on local transaction data 32*a* and local environmental data 34, while one or more different funds transaction models 40 are built using global transaction data 32*b* and global environmental data 34. Additionally or alternatively, funds transaction models 40 may be constructed using the positive training samples and the negative training samples. One or more of the funds transaction models 40 may be relied upon by the account monitor system 112 in predicting account transactions 24 and likelihood of an overdraft.

Referring again to FIG. 2, at block 206 the account monitor system 112 uses the one or more funds transaction models 40 to determine a likelihood that the financial account 20 will experience an overdraft event. Because the funds transaction model 40 is trained using one or more machine learning algorithms, the funds transaction model 40 will operate at a known certainty level. Accordingly, the account monitor system 112 can evaluate a current status of the financial account 20 to determine the likelihood of an account overdraft. As with the training step 204 discussed above, the account monitor system 112 will evaluate local and global transactional and environmental events to determine the likelihood of an account overdraft. For example, the account monitor system 112 may anticipate local, global, fixed, and/or variable recurring transactions 24 in combination with the current account balance 26 to determine the likelihood of an overdraft occurring. In a more particular example, the account monitor system 112 may recognize that a balance of the financial account is at $1000, while anticipated recurring transactions include a $1500 debit for a mortgage payment and no additional credits. Accordingly, although the account monitor system 112 cannot be fully certain that the user 100 will not deposit additional funds prior to the withdrawal of the mortgage payment the account monitor system can say with a certain level of certainty that it is likely that the financial account 20 will be overdrawn based on the funds transaction model 40. In some examples, a threshold overdraft certainty that an account overdraft will occur may be programmed into the funds transaction model 40, whereby when the overdraft certainty threshold is satisfied the account monitor system 112 initiates an overdraft prevention procedure, as shown at block 208.

At block 208*a*, the overdraft prevention procedure may include optionally transmitting a first notification to the user system 102 associated with the user 100, indicating that an account overdraft is likely to occur, and requesting authorization to transfer an amount of funds to the financial account 20 to prevent the overdraft. The notification may be passive, whereby no response is required by the user 100 to authorize the transfer of funds. Alternatively, the notification may be active, whereby the user 100 must provide an affirmative input to the user system 102 to confirm and authorize the transfer of funds to the financial account 20.

At block 208*b*, the overdraft prevention procedure of block 208 further includes transferring the amount of funds to the financial account 20 when the likelihood that the financial account 20 will incur an overdraft satisfies the threshold overdraft certainty. As provided above, this step may be dependent on an authorization of the user 100 to initiate the transfer. Alternatively, the transfer may occur automatically based on a pre-authorization by the user to transfer the amount of funds whenever the threshold overdraft certainty is satisfied.

Transferring the amount of funds to the financial account may include determining an overdraft amount associated with the overdraft event, and obtaining an amount of funds sufficient to prevent the overdraft event based on the determined overdraft amount. For example, the account monitor system 112 may determine that the financial account 20 is likely to be overdrawn by $400 due to a first transaction, and will execute a funds transfer amount greater than $400 to the financial account 20. In some examples, the account monitor system 112 will determine that multiple transactions are likely to compound the account overdraft, and will obtain a single funds transfer amount sufficient to compensate for each of the transactions.

In some examples, the amount of funds may be provided as a loan from the account monitor 110. Accordingly, in some instances, the account monitor 110 may also serve as a lender. Here, repayment of the amount of funds will be made by the user 100 to the account monitor 110, similar to a conventional loan. However, the account monitor system 112 may also be configured to authorize the transfer of the amount of funds from one or more of the external accounts 130 associated with the user 100. For example, the user 100 may authorize the account monitor system 112 to access at least one of a credit card account 130*b* or at secondary banking account 130*c* held at the financial institution 120 or at a third-party financial institution. Here, when an overdraft event is anticipated, the account monitor system 112 will transfer the amount of funds from the external account 130*b*, 130*c* to the financial account 20. Accordingly, repayment of the funds, if necessary, would be made directly to the external account 130*b*, 130*c*.

At block 210, the method 200 includes transmitting a second notification to the user system 102 indicating the transfer of the amount of funds into the financial account 20. The second notification may include funds transfer data, including data showing the value of the amount of funds transferred and the transactions predicted to cause the overdraft to occur. The second notification may further include a prompt asking for feedback from the user with respect to the transactions and the funds transfer. For example, the user may identify the transactions as being fixed, variable, recurring, or irregular. This feedback may then be provided back to the account monitor system 112 and incorporated into adjusting or retraining the funds transaction model 40.

Where the amount of funds are provided to the financial account 20 from the account monitor 110 as a loan the method 200 may include generating a loan document indicating terms for repaying the amount of funds transferred into the financial account 20, as shown at block 312. The loan document may include interest rates, repayment periods, and other terms commonly associated with loans. The loan document may be transmitted to the user system 102 concurrently with the second notification and electronically signed by the user 100. Alternatively, physical copies of the loan document may be generated and sent to the user 100 for execution.

Unlike traditional overdraft protection programs, which are provided by the financial institution 120 with which the financial account 20 is held and utilize funds from a secondary financial account held by the user 100, the overdraft prevention method 200 is conducted by a third-party lender/money transmitter and provides external funding to the financial account 20. Accordingly, as opposed to transferring funds from a credit card or savings account to a checking account after an overdraft has occurred, the overdraft prevention procedure 208 offers a transfer of funds from the account monitor 110 in advance of an anticipated overdraft. By providing the transfer of funds from the account monitor 110 in advance, the user 100 may avoid costly fees charged by the financial institution 120 associated with traditional overdraft protection programs.

Figure 3:
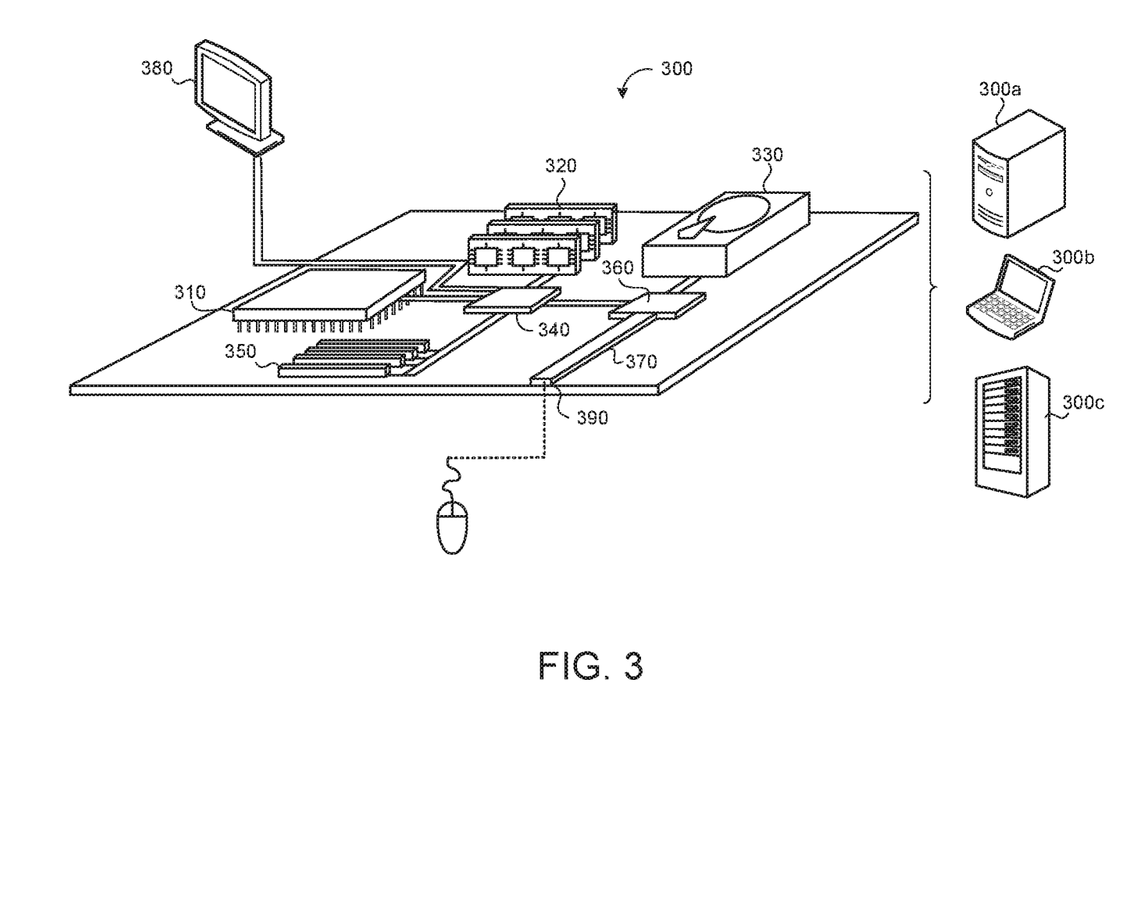
FIG. 3 is a schematic view of an example computing device that may be used to implement the systems and methods described herein.

FIG. 3 is schematic view of an example computing device 300 that may be used to implement the systems and methods described in this document. The computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 300 includes a processor 310, memory 320, a storage device 330, a high-speed interface/controller 340 connecting to the memory 320 and high-speed expansion ports 350, and a low speed interface/controller 360 connecting to a low speed bus 370 and a storage device 330. Each of the components 310, 320, 330, 340, 350, and 360, are interconnected using various busses, and may be mounted on a common motherboard or in other manners as appropriate. The processor 310 can process instructions for execution within the computing device 300, including instructions stored in the memory 320 or on the storage device 330 to display graphical information for a graphical user interface (GUI) on an external input/output device, such as display 380 coupled to high speed interface 340. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 320 stores information non-transitorily within the computing device 300. The memory 320 may be a computer-readable medium, a volatile memory unit(s), or non-volatile memory unit(s). The non-transitory memory 320 may be physical devices used to store programs (e.g., sequences of instructions) or data (e.g., program state information) on a temporary or permanent basis for use by the computing device 300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 330 is capable of providing mass storage for the computing device 300. In some implementations, the storage device 330 is a computer-readable medium. In various different implementations, the storage device 330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 320, the storage device 330, or memory on processor 310.

The high speed controller 340 manages bandwidth-intensive operations for the computing device 300, while the low speed controller 360 manages lower bandwidth-intensive operations. Such allocation of duties is exemplary only. In some implementations, the high-speed controller 340 is coupled to the memory 320, the display 380 (e.g., through a graphics processor or accelerator), and to the high-speed expansion ports 350, which may accept various expansion cards (not shown). In some implementations, the low-speed controller 360 is coupled to the storage device 330 and a low-speed expansion port 390. The low-speed expansion port 390, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 300a or multiple times in a group of such servers 300a, as a laptop computer 300b, or as part of a rack server system 300c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, user-specific financial data for a user-specific financial account associated with a user;
   obtaining, by the data processing hardware, user-specific transaction data comprising past transactions that have occurred in the user-specific financial account;
   obtaining, by the data processing hardware, global transaction data associated with third-party financial accounts identified as having transaction histories similar to the financial account associated with the user;
   training, by the data processing hardware, using machine learning, a funds transaction model on a plurality of training examples to predict overdraft events, the plurality of training examples derived from the user-specific transaction data and the global transaction data, wherein training the funds transaction model comprises:
      determining, by the data processing hardware, whether the user-specific transaction data is sufficient to train the funds transaction model; and
      when the user-specific transaction data is insufficient to train the funds transaction model, training, by the data processing hardware, the global the funds transaction model using the global transaction data;
   determining, by the data processing hardware, using the trained funds transaction model, a likelihood that the financial account will experience an overdraft event based on the user-specific financial data;
   when the likelihood that the user-specific financial account will experience the overdraft event exceeds a threshold, transferring, by the data processing hardware, an amount of funds into the financial account associated with the user, the amount of funds sufficient to prevent the overdraft event; and
   transmitting a notification to a user system associated with the user, the notification indicating the transfer of the amount of funds into the financial account.

2. The method of claim 1, wherein the plurality of training samples comprise:
   positive training samples comprising the global transaction data and/or the user-specific transaction data for one or more financial accounts experiencing one or more overdraft events; and
   negative training samples comprising the global transaction data and/or the user-specific transaction data for one or more financial accounts that never experience overdraft events.

3. The method of claim 1, wherein the user-specific transaction data comprises a transaction history including one or more credit transactions depositing funds into the user-specific financial account and/or one or more debit transactions withdrawing funds from the user-specific financial account.

4. The method of claim 1, wherein the global transaction data comprises a plurality of transaction histories associated with the third-party financial accounts and comprising one or more deposit transactions depositing funds into the third-party financial accounts and one or more withdrawal transactions withdrawing funds from the third-party financial accounts.

5. The method of claim 1, further comprising, when the likelihood that the user-specific financial account will experience the overdraft event exceeds the threshold:
   determining, by the data processing hardware, an overdraft amount associated with the overdraft event; and obtaining, by the data processing hardware, the amount of funds sufficient to prevent the overdraft event based on the overdraft amount.

6. The method of claim 5, further comprising, generating, by the data processing hardware, a loan document indicating repayment terms assigned to the user for repaying the amount of funds transferred into the user-specific financial account.

7. The method of claim 1, wherein transferring the amount of funds into the user-specific financial account associated with the user comprises:
   determining, by the data processing hardware, a date/time at which the overdraft event will occur; and
   transferring the amount of funds into the financial account before the date/time at which the overdraft event will occur.

8. The method of claim 1, further comprising, determining, by the data processing hardware, a predicted loan duration period.

9. The method of claim 1, further comprising, receiving, by the data processing hardware, an account overdraft fee schedule associated with the user-specific financial account; and
   determining, by the data processing hardware, whether a fee associated with transferring the amount of funds into the user-specific financial account exceeds a corresponding fee of the account overdraft fee schedule; and
   when the fee associated with transferring the amount of funds into the user-specific financial account does not exceed the account overdraft fee schedule, transferring of the amount of funds into the financial account.

10. The method of claim 1, wherein the amount of funds are transferred from at least one of a credit card account associated with the user, a banking account associated with the user, or a third-party lender.

11. A system comprising:
    data processing hardware; and
    memory hardware in communication with the data processing hardware, the memory hardware storing instructions that when executed on the data processing hardware cause the data processing hardware to perform operations comprising:
      receiving user-specific financial data for a financial account associated with a user;
      obtaining user-specific transaction data comprising past transactions that have occurred in the financial account associated with the user;
      obtaining global transaction data associated with third-party financial accounts identified as having transaction histories similar to the financial account associated with the user;
      training, using machine learning, a funds transaction model on a plurality of training examples to predict overdraft events, the plurality of training examples derived from the user-specific transaction data and the global transaction data, wherein training the funds transaction model comprises:
        determining whether the user-specific transaction data is sufficient to train the funds transaction model; and
        when the user-specific transaction data is insufficient to train the funds transaction model, training the global the funds transaction model using the global transaction data;
      determining, using the trained funds transaction model, a likelihood that the financial account will experience an overdraft event based on the user-specific financial data;
      when the likelihood that the user-specific financial account will experience the overdraft event exceeds a threshold, transferring an amount of funds into the financial account associated with the user, the amount of funds sufficient to prevent the overdraft event; and
      transmitting a notification to a user system associated with the user, the notification indicating the transfer of the amount of funds into the financial account.

12. The system of claim 11, wherein the training samples comprise:
    positive training samples comprising the global transaction data and/or the user-specific transaction data for one or more financial accounts experiencing one or more overdraft events; and
    negative training samples comprising the global transaction data and/or the user-specific transaction data for one or more financial accounts that never experience overdraft events.

13. The system of claim 11, wherein the user-specific transaction data comprises a transaction history comprising one or more credit transactions depositing funds into the user-specific financial account and/or one or more debit transactions withdrawing funds from the user-specific financial account.

14. The system of claim 11, wherein the global transaction data comprises a plurality of transaction histories associated with the third-party financial accounts and comprising deposit transactions depositing funds into the third-party financial accounts and withdrawal transactions withdrawing funds from the third-party financial accounts.

15. The system of claim 11, further comprising, when the likelihood that the user-specific financial account will experience the overdraft event exceeds the threshold:
    determining an overdraft amount associated with the overdraft event; and
    obtaining the amount of funds sufficient to prevent the overdraft event based on the overdraft amount.

16. The system of claim 15, further comprising, generating a loan document indicating re-payment terms assigned to the user for re-paying the amount of funds transferred into the user-specific financial account.

17. The system of claim 11, wherein transferring the amount of funds into the user-specific financial account associated with the user comprises:
    determining a date/time at which the overdraft event will occur; and
    transferring the amount of funds into the financial account before the date/time at which the overdraft event will occur.

18. The system of claim 11, further comprising, determining a predicted loan duration period.

19. The system of claim 11, further comprising, receiving a bank overdraft fee schedule; and
    determining whether a fee associated with transferring the amount of funds into the user-specific financial account exceeds a corresponding fee of the bank overdraft fee schedule; and
    when the fee associated with transferring the amount of funds into the user-specific financial account exceeds the bank overdraft fee schedule, withholding the transferring of the amount of funds into the financial account.

20. The system of claim 11, wherein the amount of funds are transferred from at least one of a credit card account associated with the user, a banking account associated with the user, or a third-party lender.

* * * * *